United States Patent [19]

Stewart

[11] Patent Number: 4,891,983

[45] Date of Patent: Jan. 9, 1990

[54] INDUCTIVELY COUPLED FORCE BALANCE INSTRUMENT

[75] Inventor: Robert E. Stewart, Woodland Hills, Calif.

[73] Assignee: Litton Systems, Inc., Beverly Hills, Calif.

[21] Appl. No.: 228,360

[22] Filed: Aug. 4, 1988

[51] Int. Cl.$^4$ .................. G01P 15/11; G01P 15/13
[52] U.S. Cl. ................................................ 73/517 B
[58] Field of Search .................. 73/517 B, 862.61, 701

[56] References Cited

U.S. PATENT DOCUMENTS

| | | | |
|---|---|---|---|
| 4,145,929 | 3/1979 | Aske | 73/517 B |
| 4,649,748 | 3/1987 | Fukano et al. | 73/517 B |
| 4,711,125 | 12/1987 | Morrison | 73/517 B |

OTHER PUBLICATIONS

Bernard, A. et al., "Three-Axis Electrostatic Accelerometer", Symposium Gyro Technology (1985), pp. 12.0–12.23.

*Primary Examiner*—Stewart J. Levy
*Assistant Examiner*—Robert P. Bell
*Attorney, Agent, or Firm*—Nilsson, Robbins, Dalgarn, Berliner, Carson & Wurst

[57] ABSTRACT

Corrective forces are applied to a movable sensitive element of a force balance instrument by inducing a current within a coil of conductive material carried by the sensitive element so that the coil interacts with an external magnetic field. The sensing element is typically maintained at a null position by controlling the interaction between the coil and the external field. In a specific embodiment, the sensing element has at least one coil wound about each of three orthogonal axes and currents are induced within each of the coils to suspend the element.

13 Claims, 5 Drawing Sheets

INDUCTIVELY COUPLED FORCE BALANCE INSTRUMENT

BACKGROUND OF THE INVENTION

The present invention relates generally to inertial guidance systems and, more particularly, to an inductively coupled force balance instrument for measuring acceleration in such systems.

Commercially available force balance instruments often have a sensitive element mounted mechanically to a base by means of a flexure suspension. Unfortunately, flexure suspensions can introduce extraneous forces which contribute to bias error. Mechanically suspended systems also permit vibropendulous rectification associated with aniosoelastic compliance of the sensing element. Such considerations make it difficult to meet existing design requirements for strap down inertial navigators and accelerometers.

Prior force balance systems also suffer in accuracy when a coil or a permanent magnet is mounted to the sensitive element. Coils on the sensitive element are typically connected to a current or voltage feedback source by flexible leads which can introduce error forces and resonant frequencies. The leads must be insulated from each other and from the sensing element, causing further instability and hysteresis.

Magnetic material on the sensitive element can cause error forces due to interaction with the case, variations in external fields and permeability of surrounding structures. The size, weight and inertia of a permanent magnet and its high permeability circuit present additional design problems, including high power requirements and consequent heat dissipation.

One method of improving bias repeatability and stability and reducing rectification error in a force balance instrument is to eliminate mechanical and electrical connections to the sensitive element. This has been done by supporting a sensing element electrostatically or electromagnetically in three axes. Systems of the electrostatic type, such as that described in A. Barnard, et al., "Three-Axis Electrostatic Accelerometer", Symposium Gyro Technology (1985), pp 12.0–12.23, exhibit square law forcing which is undesirable in force balance instruments. Prior electromagnetically supported systems, on the other hand, have high permeability sensitive elements which suffer from the disadvantages described above for systems with permanent magnets mounted to the sensitive elements. They can also introduce undesirable sensitivities and variations in magnetic properties as a function of angular position due to inhomogeneities in the magnetic material.

Therefore, it is desirable in many applications to provide a force balance instrument having improved bias stability and reduced rectification error while providing an output proportional to a sensed input. It is also desirable to provide a three-axis instrument which relies on linear forcing and has a sensing element of low mass and low permeability.

SUMMARY OF THE INVENTION

The device of the present invention is a force balance instrument in which corrective forces are applied to a movable sensitive element by interaction between an external magnetic field and a current induced within the sensitive element. The sensitive element is not connected to a voltage source and does not contain magnetic material. Instead, it has a shorted coil of conductive material which is exposed to a time-varying axial field to induce a circulating current. The resulting forcer is free of errors due to lead wires or magnetic material on the sensing element. It retains a linear relationship between force and current, provides a digital output and is fully integrating in its operation. If a number of such forcers are combined together so that a single sensitive element has a pair of shorted coils in each of three orthogonal directions, the sensitive element can be suspended entirely by electromagnetic interaction. This eliminates all errors due to mechanical suspension and enables designers to meet current requirements for strapdown inertial navigators accurate to 0.1 NM/HR and accelerometers with bias stability and repeatability of 1 $\mu g$ over an extended period.

Specifically, the present invention is an inductively coupled force balance instrument having an instrument body and a sensitive element which includes a shorted coil of conductive material associated with the body for relative movement in response to acceleration. The instrument body includes apparatus for generating a primary magnetic flux which intersects the shorted coil and apparatus for inducing within the shorted coil a current which interacts with the primary magnetic flux to generate a force opposing movement of the sensitive element. In a preferred embodiment, the instrument includes apparatus for controlling the force of interaction between the induced current and the primary magnetic flux and the controlling apparatus operates in response to a detector to restore the sensitive element to a preselected null position during acceleration. The shorted coil then comprises at least one turn of conductive material wound about a preselected axis and the primary flux generating apparatus is constructed and arranged to produce a substantially radial magnetic flux. The current inducing apparatus generates a substantially axial secondary magnetic flux which varies at a preselected rate and links the shorted coil. In a further embodiment, the sensitive element has a least one shorted coil of conductive material aligned with each of three mutually orthogonal axes and a current is induced in each of the coils to suspend the sensitive element entirely by electromagnetic means. The sensitive element preferably has a pair of such coils for each axis and the coils are joined together to form a rigid unit.

BRIEF DESCRIPTION OF THE DRAWINGS

The above and other features of the present invention may be more fully understood from the following detailed description, together with the accompanying drawings, wherein similar reference characters refer to similar elements throughout and in which.

DESCRIPTION OF THE PREFERRED EMBODIMENTS

Figure 1:
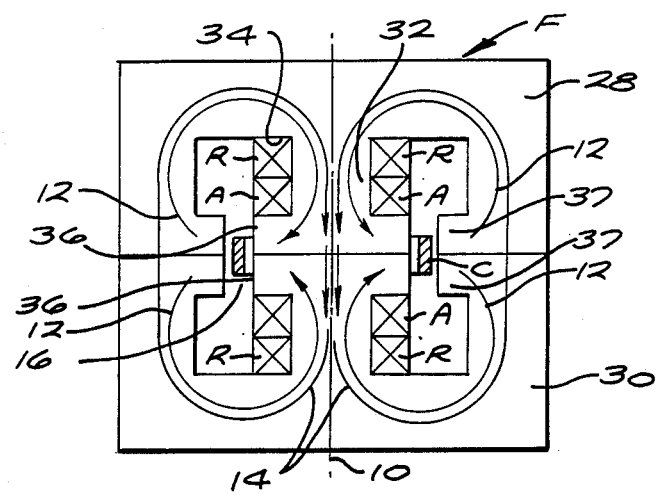
FIG. 1 is a schematic representation of an operative portion of a forcer constructed according to a preferred embodiment of the present invention.

Referring to FIG. 1, a forcer assembly F constructed according to a preferred embodiment of the present invention has a first pair of coils R wound in opposite directions about an axis 10 to generate a substantially radial magnetic flux 12 and a second pair of coils A wound in the same direction about the axis 10 to generate a substantially axial magnetic flux 14 in order to control a conductive ring C which moves axially within an air gap 16 surrounding the coils. A ramped potential is applied to the coils A to produce a changing axial flux 14 and thereby induce a current in the conductive ring C. The induced current interacts with the radial flux 12 to produce an axial force on the conductive ring.

The signals applied to the coils R and/or A are controlled in accordance with a "pickoff" signal proportional to displacement of the conductive ring C from an initial "null" position to generate an axial force opposed to the displacement. Thus, the forcer assembly F acts as a closed loop servo to maintain the conductive ring C at the null position against external acceleration forces. The forcing is linear and does not require magnetic material on the sensitive element or electrical contact with the element. The forcer is also fully integrating in some embodiments and is capable of providing a digital output.

Figure 2A:
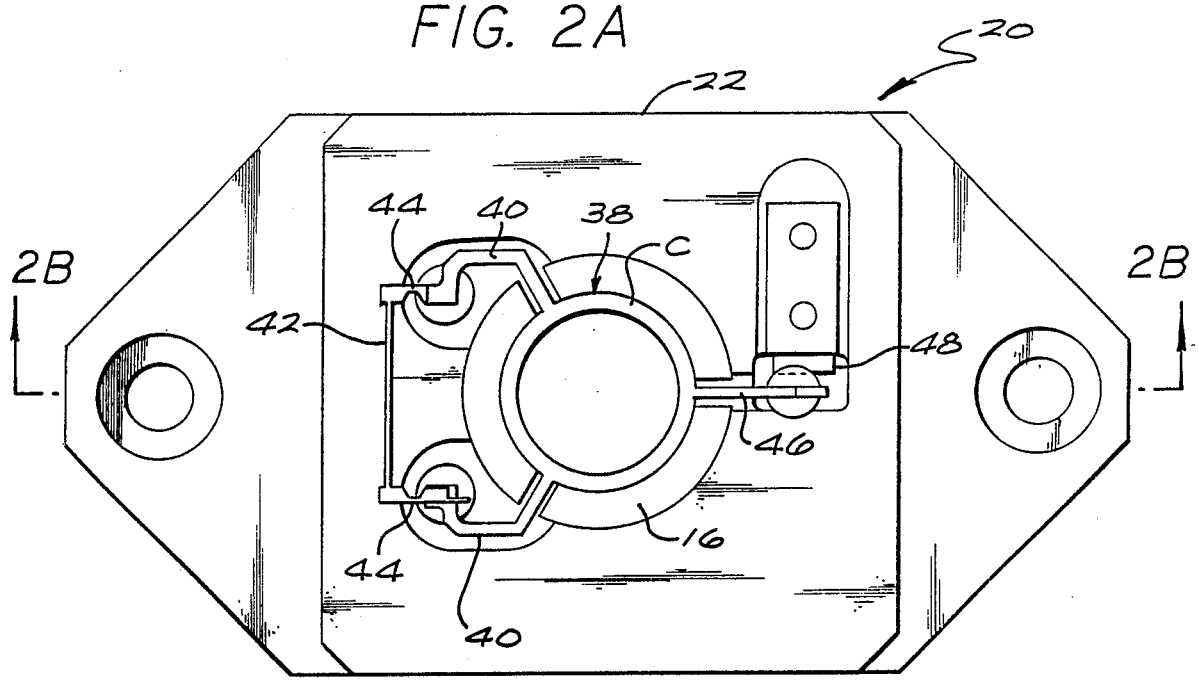
FIG. 2A is a plan view of an accelerometer embodying the principles of FIG. 1 and constructed in accordance with a preferred embodiment of the invention, with an upper portion of the housing removed.
Figure 2B:
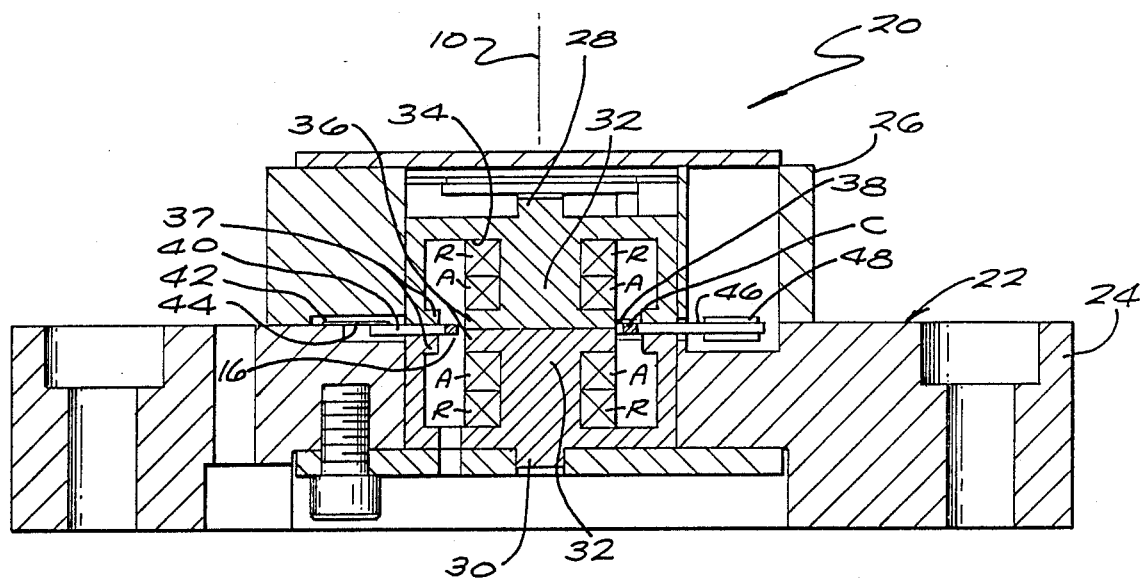
FIG. 2B is a vertical sectional view taken in the direction 2B—2B of FIG. 2A.

FIGS. 2A and 2B illustrate a single axis force balance instrument 20, in this case an accelerometer, incorporating the principles and much of the structure of the forcer assembly F. The accelerometer 20 has an instrument body 22 made up of a base portion 24 and an upper portion 26 of magnetic material. Confined within the instrument body 22 are upper and lower forcer halves 28 and 30 formed as a pair of inwardly directed cups with central legs 32 about which the coils R and A are wound.

The forcer halves 28 and 30 are preferably made of a material such as ferrite having high magnetic permeability and high electrical resistivity. Each of the central legs 32 has a flange 36 at its free end which forms an annular recess 34 about which coils R and A are wound and which opposes a flange 37 at the outer edge of the corresponding forcer half. The flanges 36 and 37 combine to form pairs of pole pieces on opposite sides of the gap 16 to conduct the radial flux 12 generated by the coils R. The axial flux 14 generated by the coils A passes from one central leg to the other without crossing the gap.

A major difference between the structure shown schematically in FIG. 1 and the hardware of FIGS. 2A and 2B is that the conductive ring C of the accelerometer 20 is part of a sensitive element or "proofmass" 38 which is mounted for pivotal movement, rather than purely axial movement, relative to the instrument body 22 under the influence of acceleration forces. The proofmass has a pair of legs 40 attached to a mechanical hinge or "flexure" 42 of the instrument body and pivotal movement occurs about a pair of narrowed hinge portions 44 of the flexure 42. The opposite side of the proofmass 38 has a rod portion 46 which extends outwardly from the conductive ring. The rod portion acts as a shadow arm for a pickoff 48 which is preferably of the optical type having a light emitting diode (LED) spaced from a photodiode to sense displacement of the shadow arm 46 from an initial position.

To a first approximation, movement of the proofmass 38 about the hinge portion 44 is equivalent to axial movement of the conductive ring C of the forcer assembly F. The accelerometer 20 thus operates in a manner similar to the forcer F with the exception that the accelerometer 20 may exhibit errors due to the mechanical connection of the proofmass 38 to the accelerometer body 22.

A first mode of operation of the forcer assembly F and the accelerometer 20 will now be described in conjunction with FIG. 3, wherein waveforms 3A-3D represent the flux density of the radial field (B), the strength of the axial field ($\Phi$), the magnitude of the current induced in the conductive ring C ($i_I$) and the corrective forces applied on the conductive ring (F), respectively. The flux density of the radial field (B) is proportional to current through the coils R ($i_R$), which coils are wound and connected so that current flows through them in opposite directions. Opposing currents generate a radial flux which crosses the gap between the flanges 36 and 37 to intersect the conductive ring C. The current through the coils R ($i_R$) begins at $t_0$ as a constant positive signal and switches polarity at $t_1$, $t_2$, $t_3$ and $t_4$, causing the radial magnetic flux (B) to change direction at those times, as well.

The current through the second pair of coils A ($i_A$) begins at a negative value and increases at a constant rate until reaching a positive maximum at $t_1$. It then decreases at the same rate to a negative maximum at $t_2$ and the process is continued. By repeatedly increasing and decreasing the current in the coils A, the strength of the axial magnetic field ($\Phi$) is increased and decreased as well (see waveform 3B). The changing magnetic flux links the conductive ring C and induces a current ($i_I$) in the ring proportional to the time rate of change of the field strength (d$\Phi$/dt). When the slope of the field strength is positive, as it is from $t_0$ to $t_1$, the induced current is constant and positive (see waveform 3C). During the period between $t_1$ to $t_2$, the field strength decreases and the induced current takes on a constant negative value. The induced current (iI) therefore alternates at the same rate and with the same polarity as the flux density of the radial field (B), giving rise to a constant positive force (F=$i_I l \times B$) as shown by waveform 3D.

The foregoing description applies when the conductive ring C is displaced in a direction requiring a positive corrective force to return it to the null position. Displacement in the opposite direction requires a negative force on the conductive ring C and necessitates a change in polarity of either the current through the coils A or the current through the coils R. In the preferred embodiment, the polarity of current through the coils A is changed for this purpose. This reverses the polarity of the axial magnetic field ($\Phi$), thereby reversing the induced current ($i_I$) and the corrective force (F) applied to the ring.

Figure 4:
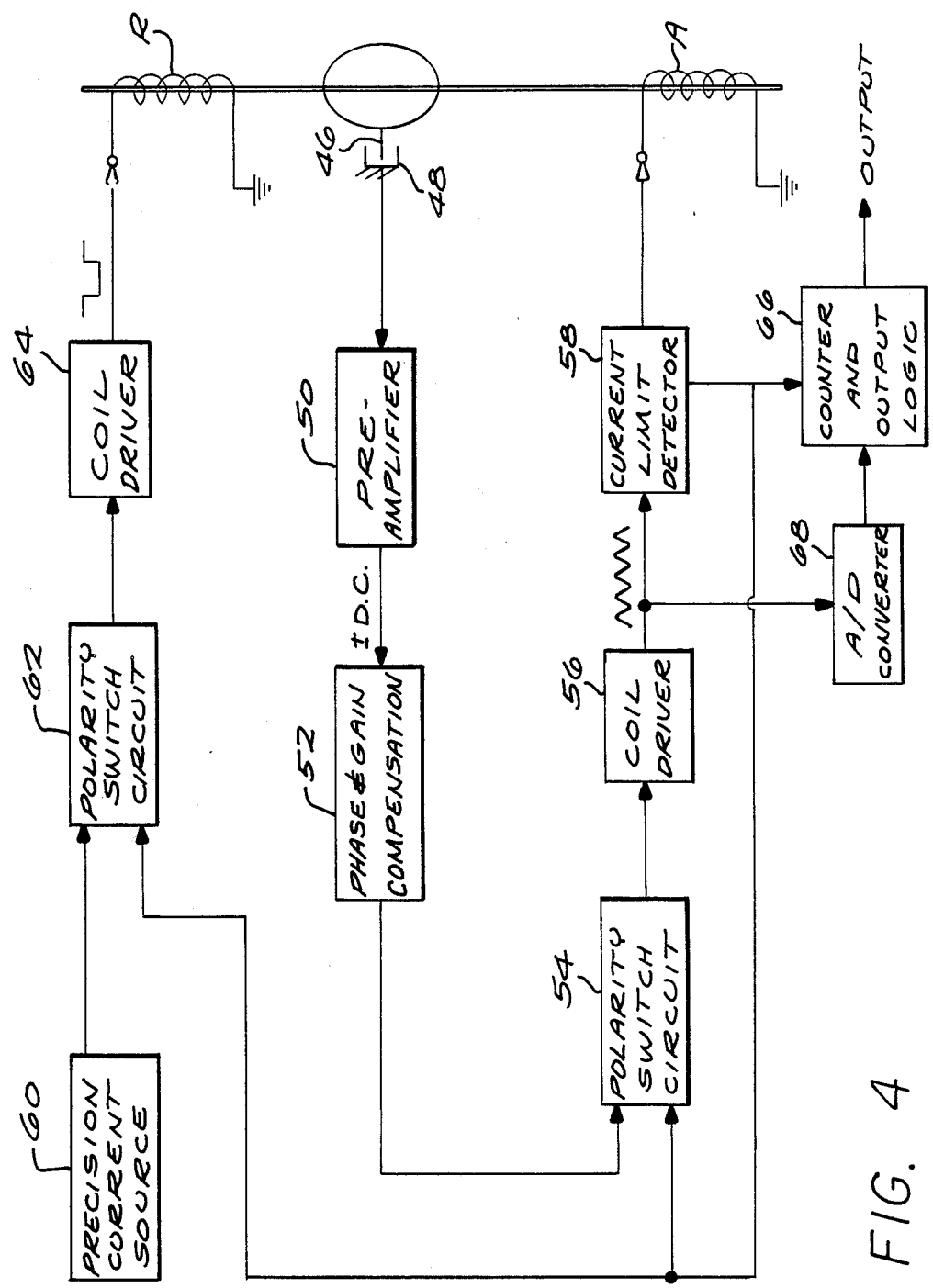
FIG. 4 is a block diagram of a control circuit by which the inductively coupled forcer of FIG. 1 or the accelerometer of FIGS. 2A and 2B can be made to function in the operating mode of FIG. 3.

A circuit for controlling the forcer assembly F in this manner is illustrated in FIG. 4. Displacement of the conductive ring C by external acceleration forces causes the shadow arm 46 to displace, resulting in an analog signal from the pickoff 48 to a preamplifier 50. The preamplifier 50 converts the signal to a low source impedance and applies it to a phase and gain compensation circuit 52 which provides required gain and phase characteristics.

The output of the compensation circuit 52 is applied to a polarity switch circuit 54 to signal a change in polarity of the pickoff signal and thus a change in direction of movement of the conductive ring C. The output of the polarity switch circuit 54 is applied to a coil driver 56 which produces a linearly ramped output signal that either increases or decreases at a predetermined constant rate in response to the polarity switch circuit. This output signal is applied to the coils A through a current limit detector 58 which provides a feedback signal to the polarity switch circuit 54 each time the output of the coil driver 56 reaches a preselected maximum or minimum value. The feedback signal causes the polarity switch circuit to change the direction in which the coil driver output is ramped and thus commence the next half cycle of the sawtooth signal ($i_A$) applied to the coils A.

The current through the coils R ($i_R$) is generated by a precision current source 60, switched by a polarity switch circuit 62, and conditioned by a coil driver 64. The polarity switch circuit 62 is triggered by the output of the current limit detector 58 to change the sign of the current through the coils R ($i_R$) each time the current through the coils A ($i_A$) is switched. Each half cycle of the current $i_R$ is thus synchronized with a corresponding half cycle of the current $i_A$, as described earlier in connection with the graphs of FIG. 3, to produce a constant force on the conductive ring C. Displacement of the conductive ring in the opposite direction past its null position changes the sign of the output of the preamplifier 50 and the phase and gain compensation circuit 52 to switch the polarity switch circuit 54. This causes the output of the coil driver 56 to change the direction in which the current $i_A$ is ramped and reverses the corrective force on the ring. The force-generating process continues in this manner as long as forces are required to offset specific forces on the conductive ring and maintain the pickoff at null.

In operation, the elements 60, 62 and 64 provide a square wave current ($i_R$) through the coils R when suitable switching signals are received from the current limit detector 58. This produces a square wave flux (waveform 3A of FIG. 3) in the radial direction across the gap. The pickoff 48 of the accelerometer 20 provides an analog signal proportional to the axial displacement of the conductive ring C from null. This signal is amplified and conditioned before being applied to the polarity switch circuit 54, the coil driver 56 and the current limit detector 58 to produce a sawtooth current ($i_A$) through the coils A (waveform 3B). The current $i_A$ induces a square wave current ($i_I$) in the ring C (waveform 3C) which is either in phase or 180 degrees out of phase with the flux produced by the coils R. The polarity of the pickoff signal determines this phase relationship and thereby controls the direction of force on the ring (C).

For a specific current through the coils R and a specific limit as to current through the coils A, the number of times that the currents are switched to return the ring to null is proportional to the force on the ring. Thus, the output of the current limit detector 58 is applied to a counter and output logic circuit 66 to provide a digital measure of the acceleration force. Analog information is also available by observing the current through the coils A and its sign to provide a signal which is the integral of the force on the ring. This information is retrieved by applying the output of the coil driver 56 to an analog-to-digital converter 67 which transmits digital velocity information to the counter and output logic circuit 66. Alternatively, a signal proportional to the force on the ring can be obtained by differentiating the observed value of current through the coils A. It is therefore possible to obtain both analog information and digital information from the circuit of FIG. 4.

Figure 3:
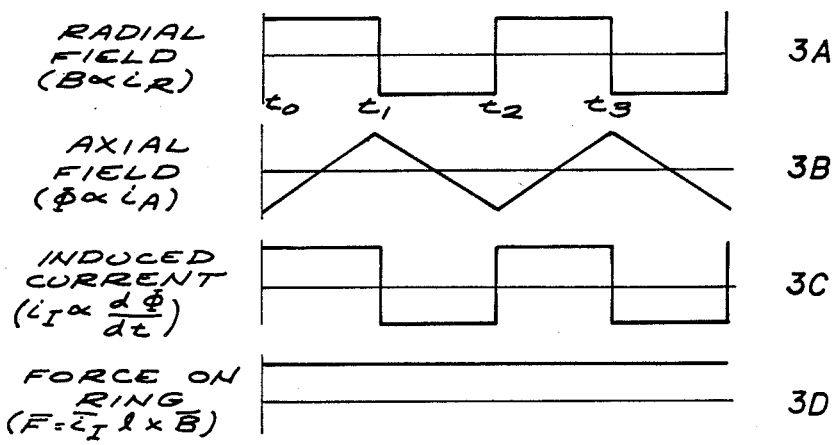
FIG. 3 is a graphical representation of magnetic, electrical and physical data representative of a first operating mode of the forcer of FIG. 1 or the accelerometer of FIGS. 2A and 2B.

The graphs of FIG. 3 are, of course, idealized in that the polarity of the radial field cannot change instantaneously. For most applications the servo loop can be held open and the control current held constant during the switching time required due to the L/R time constant of the bias circuit. Operation of the accelerometer in this manner relies on velocity storage of the ring as it departs from the pickoff position.

Figure 5:
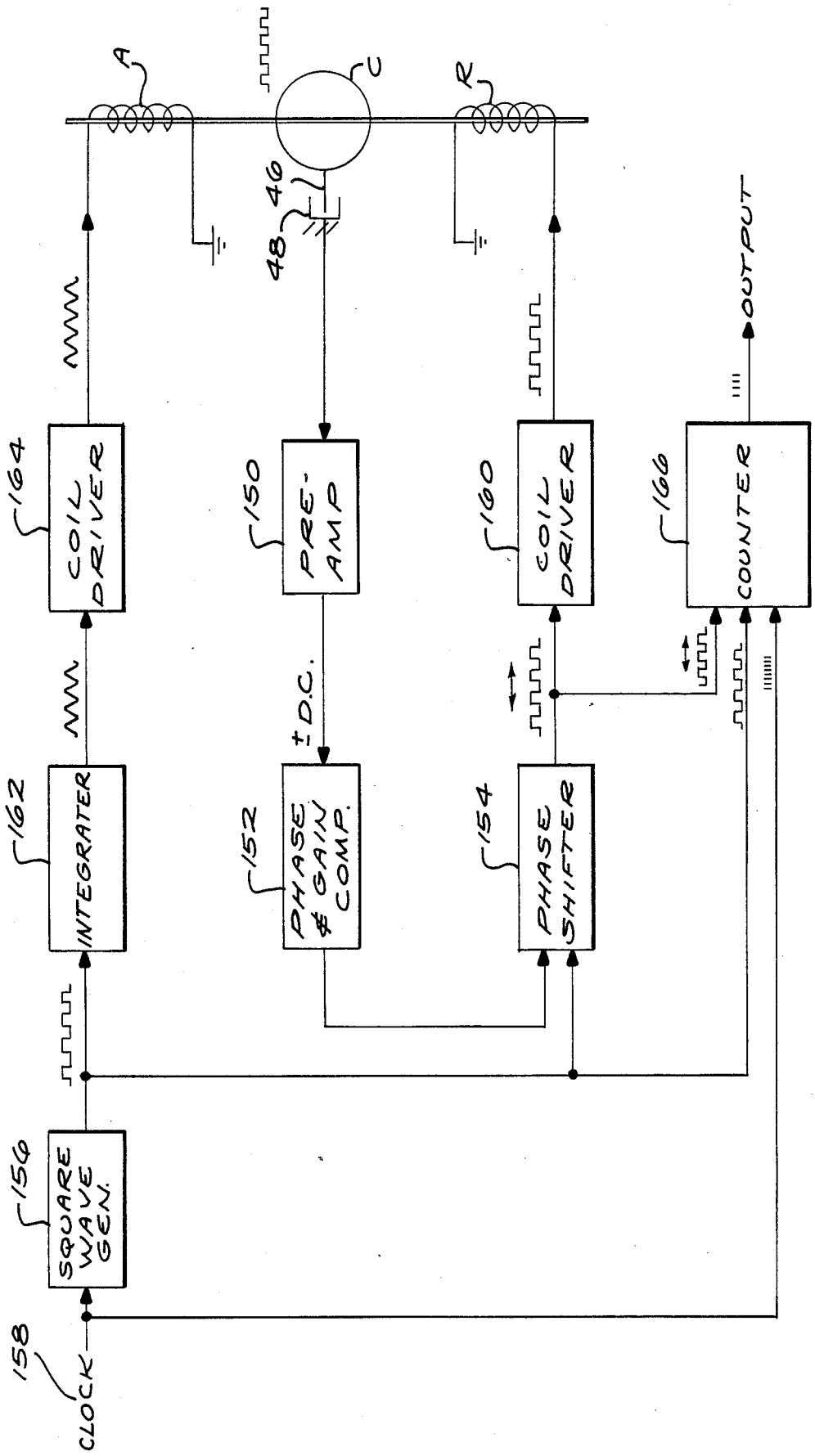
FIG. 5 is a block diagram of a circuit by which the inductively coupled forcer of FIG. 1 or the accelerometer of FIGS. 2A and 2B can be made to function in a second operating mode.

An alternate mode of controlling the conductive ring C of the forcer assembly F involves the circuit illustrated in FIG. 5. Referring to FIG. 5, displacement of the conductive ring C in response to acceleration of the forcer F causes the shadow arm 46 to trigger the pickoff 48 and sends an analog pickoff signal to a preamplifier 150. The preamplifier 150 converts the signal to a low source impedance and applies it to a phase and gain compensation circuit 152 which provides the required gain and phase versus frequency characteristics to meet preselected closed loop stability and bandwidth criteria.

Figure 6:
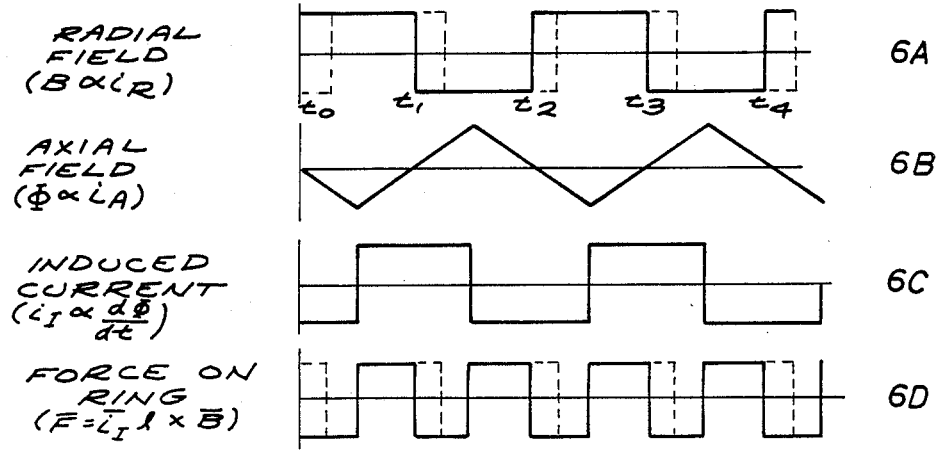
FIG. 6 is a graphical representation of magnetic, electrical and physical data representative of the second operating mode of the forcer of FIG. 1 or the accelerometer of FIGS. 2A and 2B.

The output of the compensation circuit 152 is applied to a voltage controlled phase shift circuit 154 which advances or retards the output phase of a square wave generator 156 synchronized to a clock signal 158. The phase shifted square wave output is applied to a coil driver circuit 160 and ultimately to the coils R for generating a radial magnetic flux which intersects the conductive ring C. This signal is illustrated as waveform 6A of FIG. 6, wherein the full line trace represents the radial flux density when the conductive ring C is at the null position and the broken lines represent a phase-shifted signal corresponding to displacement of the ring from its null position in a direction for which a positive corrective force is required.

The square wave output of the generator 156 is also applied to an integrator 162 which converts the square wave to a sawtooth signal. The sawtooth signal is conditioned by a coil driver circuit 164 which provides impedance match and power gain required to drive the coils A and produce an axial magnetic field. The strength of the axial field ($\Phi$) which is proportional to the current through the coils A ($i_A$), is represented by waveform 6B of FIG. 6. Inductive coupling between the coils A and the conductive ring C causes a square wave current signal with a magnitude equal to the time rate of change of the axial field ($d\Phi/dt$) to be induced in the conductive ring. This is shown as waveform 6C of FIG. 6.

When a force is not required to maintain the pickoff at null, the difference in phase between the current induced in the conductive ring C ($i_I$) and the flux density of the radial magnetic field (B) is 90 degrees. This is accomplished by providing a 90 degree difference in phase between the output of the square wave generator 156 and the output of the voltage controlled phase shifter 154. These outputs are applied as gate signals to a counter 166 which counts the signals from the clock 158. The counter 166 alternately counts up and down in response to changes in the levels of the two gate signals, yielding a net zero counts for a 90 degree phase difference.

When the body of the forcer F or the accelerometer 20 is accelerated, the conductive ring C produces a nonzero analog signal from the pickoff 48. In order to null this signal, the phase of the signal applied to the control coil is modified by the phase shifter 154, causing a shift in the radial flux density shown by the broken line curve of waveform 6A. This causes the cross product of the induced current ($i_I$) and the redial flux density (B) to be nonzero, as indicated by the broken lines in waveform 6D. The direction of the force on the conductive ring C depends on whether the phase is advanced or retarded. The net "up" or "down" count of the counter 166 in the course of this process is proportional to the velocity of the ring. Acceleration information is provided as the number of pulses per unit time.

From the foregoing, it is clear that the forcer assembly of FIG. 1 can be operated in any number of modes, only two of which are considered in detail herein. In each mode, a first field component is generated and varied over time to induce a current in the conductive ring C and a second field component is generated to intersect the ring and thereby apply a force tending to return the ring to its null position. This can be accomplished by control of either component of the field in accordance with the pickoff signal.

Figure 7:
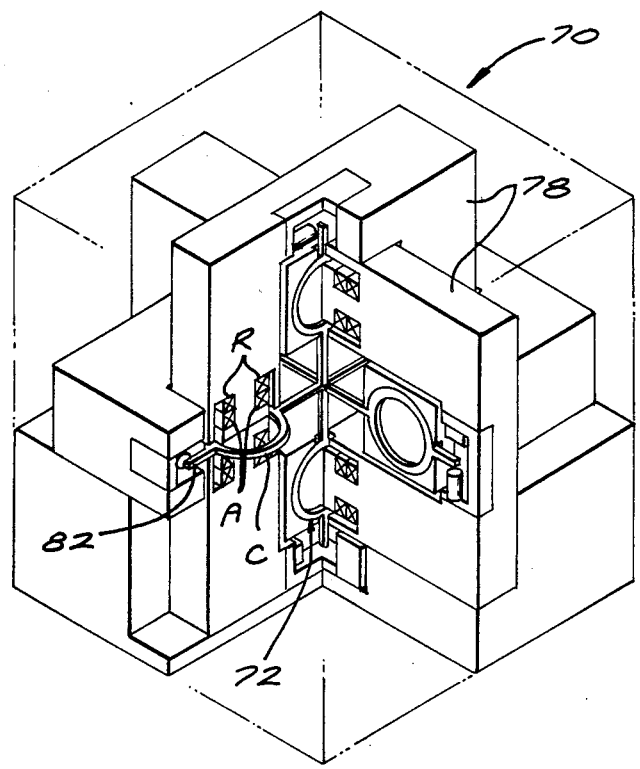
FIG. 7 is a partial vertical sectional view of a three-axis linear and angular integrating accelerometer constructed in accordance with another preferred embodiment of the invention, taken along a pair of perpendicular planes.
Figure 8:
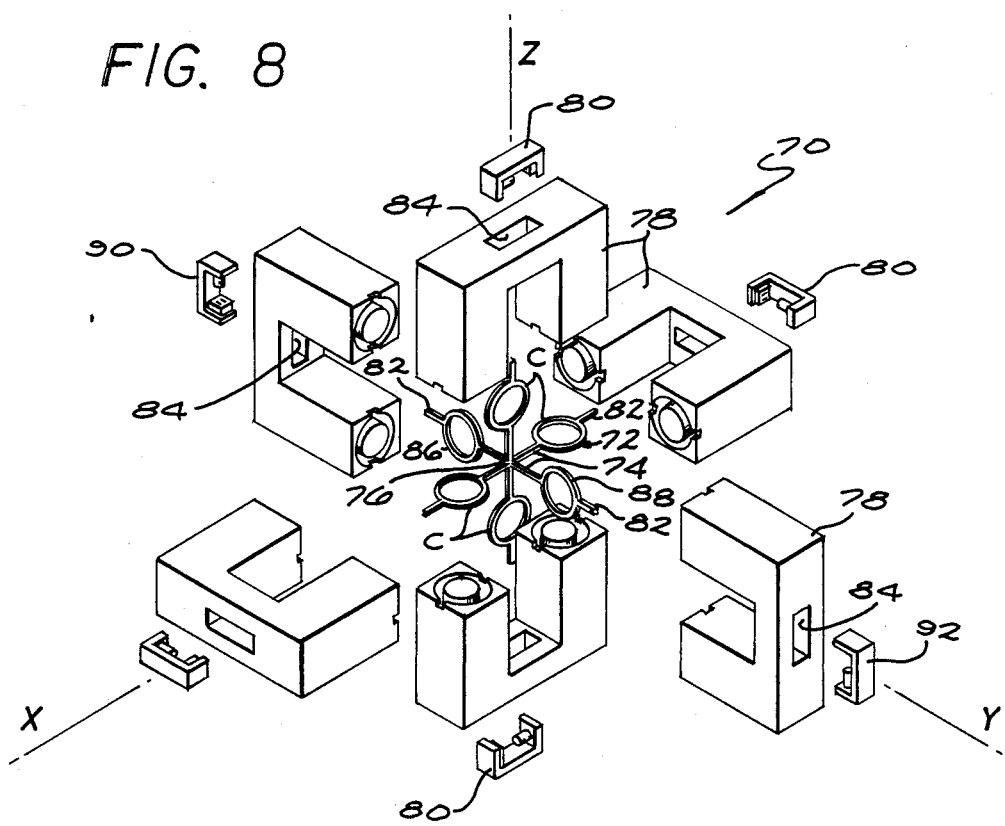
FIG. 8 is a exploded isometric view of the accelerometer of FIG. 7.

Referring now to FIGS. 7 and 8, a three axis linear and angular integrating accelerometer 70 incorporates a total of six forcer assemblies equivalent to the forcer assembly of FIG. 1 to suspend a proofmass 72 electromagnetically without mechanical aid. This eliminates errors due to supporting mechanisms and factors such as vibropendulous rectification.

The proofmass 72 is made up of three pairs of conductive rings C connected together by individual spokes 74 which intersect at a central point 76 to form a single rigid proofmass. The conductive rings of each pair are co-planar and are spaced laterally from each other on opposite sides of the central point 76 to sense linear acceleration parallel to the axes of the conductive rings as well as angular acceleration about a perpendicular axis.

Each pair of conductive rings is confined between a pair of U-shaped elements 78 for which each leg of the "U" corresponds to one of the forcer halves 28 or 30 of the forcer assembly of FIG. 1. The two U-shaped forcer elements 78 associated with each pair of conductive rings C thus form a pair of "forcer assemblies" capable of detecting linear acceleration along the axes of the conductive rings as well as angular acceleration about a transverse axis midway between the conductive rings. The accelerometer 70 contains one structure of this type for each pair of conductive rings C, adding up to a total of six forcer assemblies capable of measuring linear acceleration in three mutually orthogonal directions and measuring angular acceleration about three mutually orthogonal axes.

The U-shaped elements 78 interfit with one another about the proofmass 72 to form a single compact apparatus in which movement of each conductive ring is monitored by a corresponding pickoff 80 positioned to sense movement of a shadow rod 82 extending outwardly from the ring. The pickoffs 80 are preferably of the optical type for sensing the position of the shadow rod 82 without applying a force to the proofmass. Each pickoff is located within an opening 84 of one of the U-shaped elements 78 at the bight of the "U" defined by the element.

From a functional standpoint, each conductive ring of the accelerometer 70 interacts with a separate forcer assembly in the manner of the forcer assembly of FIG. 1. Thus, the axial position of each ring is monitored and constrained as described above. Each pair of conductive rings accounts for two of the six possible degrees of freedom of the proofmass 72, i.e., translational movement in a direction parallel to the axes of the two conductive rings and rotational movement about a transverse axis within the plane of the conductive rings and midway between them. Translational information is derived as the sum of the outputs of the pickoffs associated with the two conductive rings and rotational information is derived as the difference of those outputs. The remaining four degrees of freedom are servo controlled in the same manner using the other two pairs of conductive rings.

In considering the operation of the accelerometer 70, it is useful to assume that four of the six possible degrees of freedom are servo controlled so that translation along the x axis and rotation about the z axis are the only motions of the proofmass allowed. Such motions are detectable using the conductive rings identified in FIG. 7 by the numerals 86 and 88. When the device is exposed to acceleration having a component along the positive x axis, the proofmass translates along the negative x axis and pickoffs 90 and 92 associated with the rings 86 and 88, respectively, develop signals proportional to the distance traveled. Each pickoff signal is applied to a servo amplifier which regulates current in the coils A and/or B of the associated forcer halves to induce a current in the conductive ring and generate a radial magnetic flux which interacts with the induced current to produce a corrective force.

Although the signals to the coils depend on the specific mode in which the forcer operates, the signal to at least one of the coils must be controlled in accordance with the direction and/or magnitude of movement of the conductive ring. In the mode represented by the waveforms of FIG. 3, the current through the second pair of coils A is ramped at a preselected rate to produce a desired level of induced current within the conductive ring and thus a desired force on the ring. The sawtooth waveform applied to the coils A is 180 degrees different in phase for a "negative" displacement of the conductive ring from what it is for a "positive" displacement. As described in connection with FIG. 1, the slope of the current through the coil A typically varies in proportion to the magnitude of ring displacement. In the mode of operation reflected in the waveforms of FIG. 6, on the other hand, the phase of pulses applied to the radial field coils R is varied to produce a force on the ring. In either case, the individual forcer halves operate in the same way as the forcer assembly of FIG. 1.

The outputs of the forcers associated with the conductive rings 86 and 88 will be in phase for linear acceleration along the x axis and 180 degrees out of phase for angular acceleration about the z axis. The outputs will therefore be added to measure linear acceleration and subtracted to measure angular acceleration. Each of the two remaining pairs of pickoffs, forcers and conductive rings provide for the measurement of linear and angular acceleration along and about the other possible axes. All six degrees of freedom are therefore servo controlled, providing three axes of linear acceleration and three axes of angular acceleration information.

The three axis integrating accelerometer of FIGS. 7 and 8 meets the objectives of eliminating all mechanical and electrical contact with the proofmass, maintaining a nonmagnetic proofmass and retaining a linear forcer. Thus, only inertial forces affect the relative position of the proofmass and all of such forces are measured by the restoring servo loops. The three axis integrating accelerometer therefore exhibits extremely small values of bias and bias variation, making it suitable for high accuracy strapdown navigation systems in the 0.1 NM/HR category. The incorporation of an integrating forcer and the lack of mechanical restraint implies a threshold limited only by the time allowed for integration and filtering. The lack of a pendulous type suspension also eliminates vibropendulous rectification error which currently limits the performance of strapdown inertial navigation systems under vibration.

The integrating nature of the forcer and the digital output of the accelerometer of the present invention also permit a more direct interface with system computers. Scaling of the outputs can be changed by selection of currents through the coils R and A, and selection of limits on the current through the coils A. These currents and/or current limits may be made a function of the sensed acceleration, providing an autoranging capability and permitting operation over a very wide dynamic range. Because closed loop servo support is provided for three directions of angular freedom as well as three directions of translational freedom, the instrument of FIGS. 7 and 8 has the unique capability of providing twelve channels of information, i.e., four channels for each of three orthogonal input axes. These four channels are linear acceleration, linear velocity, angular acceleration and angular velocity. In some applications, such as attitude and heading reference systems, the angular acceleration and angular velocity information supplied by the instrument can provide sufficient accuracy to eliminate the need for additional gyroscopes.

While specific embodiments of the present invention have been disclosed as typical, the invention is not limited to these particular forms, but rather is applicable broadly to all such variations as fall within the scope of the appended claims. For example, the conductive rings C of FIGS. 1, 2, 4, 5, 7 and 8 can be any form of shorted coil having at least one turn wound around a preselected axis. Likewise, the coils A and R need not be separate coils but may be implemented by a single coil on which two drive signals are superimposed to give the desired results.

What is claimed is:

1. An inductively coupled force balance instrument comprising:
    an instrument body;
    a sensitive element having a shorted coil of conductive material associated with said body for relative movement in response to acceleration of the body;
    means for generating a primary magnetic flux intersecting the shorted coil; and
    means for inducing within the shorted coil a current which interacts with said primary magnetic flux to generate a force opposing said movement.

2. The inductively coupled force balance instrument of claim 1 which further comprises:
    means for controlling the force of interaction between the induced current and said primary magnetic flux.

3. The inductively coupled force balance instrument of claim 2 wherein:
    the instrument includes means for detecting the position of the sensitive element relative to the instrument body; and
    the controlling means operates in response to the detecting means to restore the sensitive element to a preselected null position during acceleration of the body.

4. The inductively coupled force balance instrument of claim 1 wherein:
    the shorted coil comprises at lease one turn of conductive material wound about a preselected axis; and
    the primary flux generating means is constructed and arranged to produce a substantially radial magnetic flux which intersects said at least one turn.

5. The inductively coupled force balance instrument of claim 1 wherein:
    the current inducing means includes means for generating a substantially axial secondary magnetic flux which changes over time and links the shorted coil.

6. The inductively coupled force balance instrument of claim 5 wherein:
    the secondary flux generating means is constructed and arranged to generate a flux which changes at a preselected rate.

7. The inductively coupled force balance instrument of claim 5 wherein:
    the primary flux generating means comprises a pair of windings aligned with the preselected axis on opposite sides of the shorted coil and capable of being energized oppositely to produce a substantially radial magnetic flux intersecting the shorted coil; and
    the secondary flux generating means comprises at least one winding aligned with the preselected axis and capable of being energized to produce a substantially axial magnetic flux.

8. An inductively coupled force balance instrument comprising:
    an instrument body;
    a sensitive element associated with said body for relative movement in response to acceleration of the body, the sensing element having at least one shorted coil of conductive material aligned with each of three mutually orthogonal axes;
    means for generating a primary magnetic flux intersecting each shorted coil; and
    means for inducing within each shorted coil a current which interacts with the primary magnetic flux to generate forces opposing said movement.

9. The inductively coupled force balance instrument of claim 8 wherein:
    the sensitive element has at least two shorted coils aligned with each of said axes, the coils being joined together to form a rigid unit for movement in response to acceleration of the body.

10. The inductively coupled force balance instrument of claim 9 wherein:
the sensitive element does not contact the instrument body during operation.

11. The inductively coupled force balance instrument of claim 8 which further comprises:
means for controlling the force of interaction between the currents induced in each coil and the primary magnetic flux.

12. The inductively coupled force balance instrument of claim 11 wherein:
the instrument includes means for detecting the position of each shorted coil relative to the instrument body; and
the controlling means operates in response to the detecting means to restore the sensitive element to a preselected null position after acceleration of the body.

13. The inductively coupled force balance instrument of claim 11 wherein:
the primary flux generating means is constructed and arranged to produce a substantially radial magnetic flux which intersects each shorted coil; and
the current inducing means includes means for generating a secondary magnetic flux for each shorted coil which changes over time and links the shorted coil.

* * * * *